United States Patent
Di Pietro et al.

(10) Patent No.: US 11,182,470 B2
(45) Date of Patent: Nov. 23, 2021

(54) ONLINE ACCOUNT ACCESS RECOVERY SYSTEM AND METHOD UTILIZING SECRET SPLITTING

(71) Applicant: Qatar Foundation for Education, Science and Community Development, Doha (QA)

(72) Inventors: Roberto Di Pietro, Doha (QA); Simone Raponi, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 77 days.

(21) Appl. No.: 16/880,525

(22) Filed: May 21, 2020

(65) Prior Publication Data
US 2020/0372149 A1    Nov. 26, 2020

Related U.S. Application Data

(60) Provisional application No. 62/852,427, filed on May 24, 2019.

(51) Int. Cl.
| | |
|---|---|
| *G06F 21/00* | (2013.01) |
| *G06F 21/45* | (2013.01) |
| *G06F 21/60* | (2013.01) |
| *H04L 9/08* | (2006.01) |

(52) U.S. Cl.
CPC ............ *G06F 21/45* (2013.01); *G06F 21/602* (2013.01); *H04L 9/085* (2013.01); *H04L 9/0863* (2013.01); *H04L 9/0869* (2013.01); *H04L 9/0894* (2013.01); *G06F 2221/2131* (2013.01)

(58) Field of Classification Search
None
See application file for complete search history.

(56) References Cited

U.S. PATENT DOCUMENTS

| | | | |
|---|---|---|---|
| 9,813,243 | B1 | 11/2017 | Triandopoulos et al. |
| 9,813,244 | B1 * | 11/2017 | Triandopoulos ...... H04L 63/061 |
| 2015/0244522 | A1 | 8/2015 | Cheruvath et al. |
| 2015/0378842 | A1 | 12/2015 | Tomlinson et al. |
| 2016/0117499 | A1 | 4/2016 | Roy et al. |
| 2017/0250972 | A1 * | 8/2017 | Ronda ...................... H04L 9/08 |
| 2018/0314819 | A1 | 11/2018 | Shankaranarayanan et al. |
| 2019/0138753 | A1 * | 5/2019 | Wallrabenstein ........ G09C 1/00 |

* cited by examiner

*Primary Examiner* — Andrew J Steinle
(74) *Attorney, Agent, or Firm* — K&L Gates LLP (57) ABSTRACT

The present disclosure provides a new and innovative system, method, and non-transitory computer-readable medium for securely recovering access to an online service account. Secret splitting is utilized to require multiple recovery mechanisms in order to recover access to an online service account, thus decreasing the likelihood that a malicious attacker will compromise all of the recovery mechanisms to gain access to the online service account. The secret is split into a quantity of tokens via a secret sharing function that can reconstruct the secret with a predetermined threshold quantity of the tokens. The level of security provided by the system is flexible by adjusting the quantity of recovery mechanisms and the predetermined threshold quantity of tokens required to reconstruct the secret.

20 Claims, 3 Drawing Sheets

ONLINE ACCOUNT ACCESS RECOVERY SYSTEM AND METHOD UTILIZING SECRET SPLITTING

PRIORITY CLAIM

The present application claims priority to and the benefit of U.S. Provisional Application 62/852,427, filed May 24, 2019, the entirety of which is herein incorporated by reference.

BACKGROUND

With most modern companies increasingly offering online services, the number of login credentials, such as a username and password, that a typical user creates for online service accounts may be large and increasing. Often, some users may have the same username and/or password for some, most, or all of their online service accounts so that the users are able to remember their login credentials for each online service account. Accordingly, a malicious attacker may gain access to some, most, or all of these users' online service accounts by compromising a single one of the users' online service accounts. Moreover, the increasing number of online service accounts and login credentials increases the likelihood that a malicious attacker may compromise one of a user's online service accounts.

In an effort to combat a malicious attacker gaining access to all of their accounts by compromising a single account, some users vary their login credentials between online service accounts, such as varying passwords. A typical problem, however, is that users forget their login credentials and need to reset them, such as resetting a password. One method for online service providers to enable users to reset login credentials is to, upon a reset request, send users their login credentials to a recovery mechanism registered by the user, such as an email address or a phone number. Another method is to, upon a reset request, send randomly generated, temporary login credentials to users' recovery mechanisms. The users may use the temporary login credentials to gain access to their account and may then change the login credentials as they see fit. Another method still is to, upon a reset request, send a reset link to users' recovery mechanisms that, upon activation, prompts the users to input new login credentials.

A drawback of the above-described login credential reset methods, however, is that a malicious attacker may compromise users' service accounts by compromising their recovery mechanism to obtain users' login credentials, temporary login credentials, or reset link. For instance, a malicious attacker may request a password reset for a user and then hack the user's email account to obtain the login credentials, temporary login credentials, or reset link. Malicious attackers may therefore still compromise a user service account by compromising only a single account, the recovery mechanism. Once malicious attackers have gained access, they can change the account's login credentials and prevent users from accessing their own online service accounts.

An additional threat is represented by the service provider that manages the standard recovery mechanism of the user. For instance, a user may set their email account as the recovery mechanism. A malicious attacker may be an employee of an email service provider that manages the account of the user. This malicious employee has an opportunity to illegally access (without hacking) the emails of the user and obtain the credentials. The attack can be active (e.g., the malicious employee requests a password reset for a user, and then the employee accesses the e-mail) or passive (e.g., the malicious employee waits for when the user resets his password, and then the employee accesses the e-mail). In both cases, the malicious employee is able to obtain the credentials of the user.

Additionally, another drawback of the above-described login credential reset methods is that they only provide a user with one level of security that cannot be adjusted based on a user's security needs.

Accordingly, a more secure and flexible mechanism for recovering access to an online service account is desired to help prevent malicious attackers from compromising online service accounts.

SUMMARY

The present disclosure provides a new and innovative system, method, and non-transitory computer-readable medium for securely recovering access to an online service account. Secret splitting is utilized to require multiple recovery mechanisms in order to recover access to an online service account, thus decreasing the likelihood that a malicious attacker will compromise all of the recovery mechanisms to gain access to the online service account. Recovery parameters may also be adjusted to provide flexibility in a level of security provided by the system. In an example, an authentication input recovery system includes a memory and a processor, in communication with the memory. The processor is configured to receive a recovery request from a user including identifying input, generate an authentication secret in response to verifying the identifying input, and input the generated authentication secret into a cryptographic secret sharing function, thereby splitting the generated authentication secret into a plurality of tokens. The processor is also configured to transmit the plurality of tokens to a plurality of secret recovery resources, receive at least a portion of the plurality of tokens from the user, and determine a reconstructed authentication secret based on the at least a portion of the plurality of tokens. The processor is further configured to compare the reconstructed authentication secret to the generated authentication secret and provide to the user, access to a service in response to the reconstructed authentication secret matching the generated authentication secret.

In an example, a method includes receiving a recovery request from a user including identifying input, generating an authentication secret in response to verifying the identifying input, and inputting the generated authentication secret into a cryptographic secret sharing function, thereby splitting the generated authentication secret into a plurality of tokens. The method also includes transmitting the plurality of tokens to a plurality of secret recovery resources, receiving at least a portion of the plurality of tokens from the user, and determining a reconstructed authentication secret based on the at least a portion of the plurality of tokens. The method further includes comparing the reconstructed authentication secret to the generated authentication secret, and providing to the user, access to a service in response to the reconstructed authentication secret matching the generated authentication secret.

In an example, a non-transitory, computer-readable medium stores instructions. The instructions, when performed by a processor, cause the processor to receive a recovery request from a user including identifying input, generate an authentication secret in response to verifying the identifying input, and input the generated authentication secret into a cryptographic secret sharing function, thereby splitting the generated authentication secret into a plurality of tokens. The instructions, when performed by the processor, may also cause the processor to transmit the plurality of tokens to a plurality of secret recovery resources, receive at least a portion of the plurality of tokens from the user, and determine a reconstructed authentication secret based on the at least a portion of the plurality of tokens, where determining the reconstructed authentication secret requires a predetermined quantity of tokens of the plurality of tokens and the at least a portion of the plurality of tokens is equal to or greater than the predetermined quantity. The instructions, when performed by the processor, may further cause the processor to compare the reconstructed authentication secret to the generated authentication secret, and provide to the user, access to a service in response to the reconstructed authentication secret matching the generated authentication secret.

DETAILED DESCRIPTION

The present disclosure provides for secure online account access recovery through the utilization of secret splitting and multiple secret recovery resources. The provided system helps provide increased and more flexible security as compared to typical account recovery systems. A website or application platform may utilize the provided system to enable users to regain access to registered accounts for which they have forgotten or lost their login credentials, such as their password. In response to a user requesting an account or password reset, the provided system may generate a secret, store the secret, and also split the secret into a set of tokens via a secret sharing function. The quantity of tokens that the secret is split into is adjustable. The secret sharing function can reconstruct the secret using a predetermined threshold quantity of the set of tokens. This predetermined threshold quantity is adjustable and may be less than the quantity of tokens in the set of tokens.

Each individual token in the set of tokens is transmitted to a number of secret recovery resources that a user maintains, such as email addresses or phone numbers. For instance, one token may be transmitted to each secret recovery resource. The user may obtain some or all of the tokens from the user's secret recovery resources and transmit those obtained to the provided system via the website or application platform. If the quantity of transmitted tokens is greater than the predetermined threshold quantity needed for reconstruction, the provided system reconstructs the secret using the received tokens. The reconstructed secret is compared to the generated secret that is stored, and if they match, the user is provided access to the user's online account.

The presently disclosed system therefore provides additional security beyond typical account recovery methods by dispersing the account recovery means among multiple recovery resources. If a malicious attacker were to attempt to impersonate a user by requesting a password reset of the user's account, the malicious attacker would need to obtain a sufficient quantity of tokens from the user's various recovery resources in order to gain access to the user's account. Obtaining the tokens would require the malicious attacker to compromise more than one, and possibly many, recovery resources, which decreases the likelihood that the malicious attacker is able to gain access to the user's account as compared to the malicious attacker needing to compromise only a single recovery resource to do so in typical account recovery methods. This decrease in likelihood increases the level of security provided by the presently disclosed system.

The provided system additionally provides more flexibility to a security level of an account recovery method. The security level may be balanced with user convenience. For instance, the number of secret recovery resources utilized is adjustable, with more recovery resources increasing the level of security. The quantity of tokens a generated secret is split into is also adjustable and may be adjusted to correspond to the number of secret recovery resources being utilized. For example, if a user designates five secret recovery resources, then the provided system may be adjusted such that a generated secret is split into five tokens so that one token may be transmitted to each secret recovery resource. In some instances, however, a user may not want to maintain five different secret recovery resources because the inconvenience is not worth the added security in view of the online account's importance to the user. In such instances, a user may only designate two or three secret recovery resources and the provided system may be adjusted accordingly.

In addition, the predetermined threshold quantity of tokens required to reconstruct a secret is adjustable. The greater the threshold quantity, the higher the level of security. For example, requiring a user to provide five out of five tokens provides a higher level of security than requiring the user to provide three out of five tokens because the two extra tokens may be transmitted to two distinct secret recovery resources. A malicious attacker would have to compromise two additional resources to obtain two additional tokens in the former as compared to the latter. In some instances, however, a user may initially designate five secret recovery resources for an online service account, though worry that they may lose or forget their login credentials to some of the secret recovery resources, and accordingly desire that only a portion of the tokens are required to regain access to the online service account. In such instances, the user may still be able to recover access to the online service account even if the user loses access to a portion of the secret recovery resources, and thus this convenience may be preferable to some users based on the importance of the online service account to the user.

In some aspects of the present disclosure, a user can manage the set-up and recovery of a secret by the user's self, without interacting with a website, application platform, or other service. For instance, the user may utilize the presently disclosed system as a means of password storage by providing an online account password to the system and storing the generated tokens on various secret recovery resources. If the user forgets the user's password, the user may obtain the tokens and re-obtain the user's password via the provided system. In this way, the user can recover access to the user's online account without having to reset the user's account or password or otherwise interact with the online service.

Figure 1:
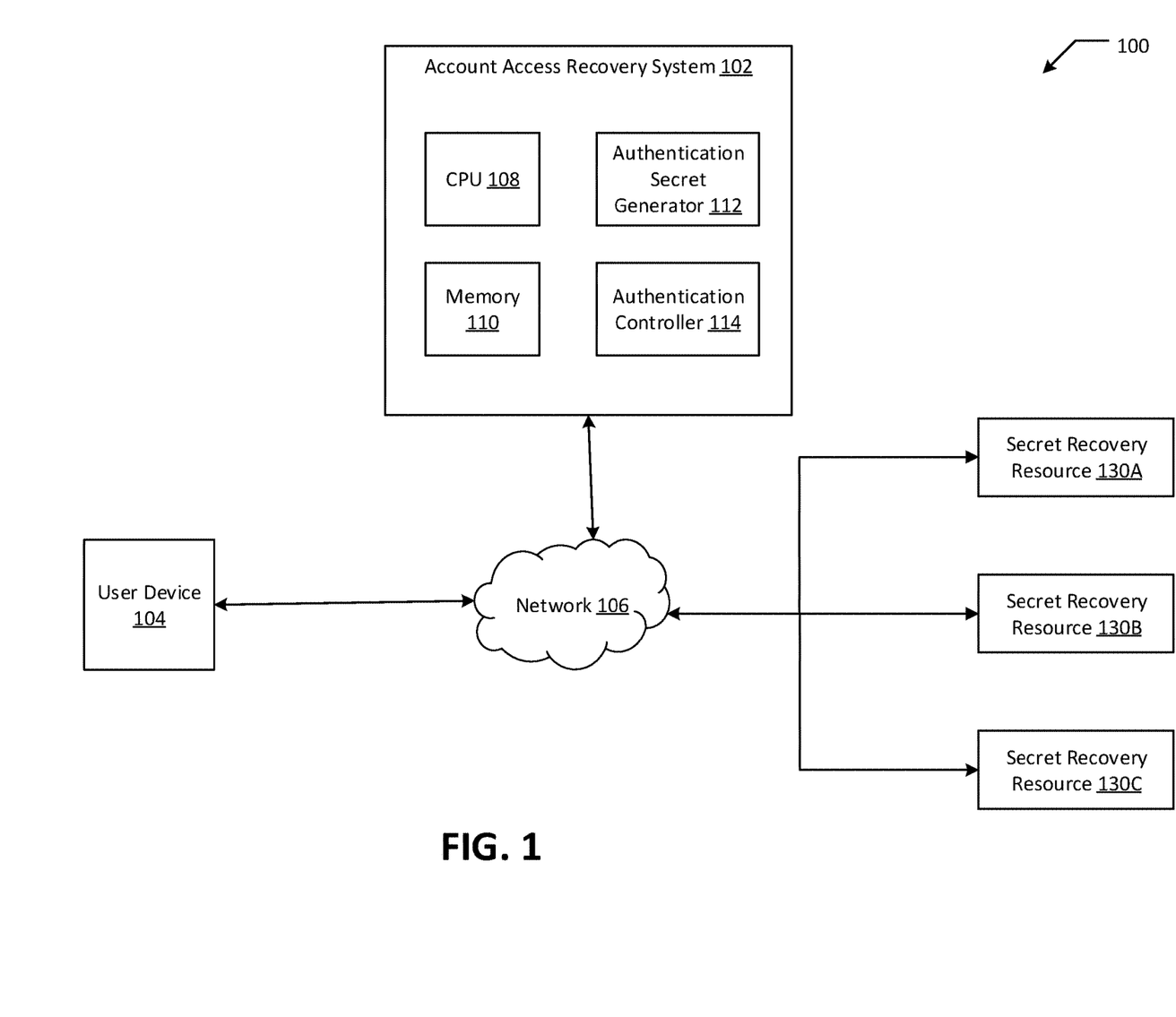
FIG. 1 illustrates a block diagram of an example system for securely recovering access to an online service account, according to an aspect of the present disclosure.

FIG. 1 illustrates a block diagram of an example system 100 for securely recovering access to an online service account. The example system 100 includes a user device 104 that transmits a recovery request to an account access recovery system ("AARS") 102. For instance, the user device 104 may transmit the recovery request over a network 106 to the AARS 102. The user device 104 may be any type of device including a smartphone, a cellular phone, a tablet computer, a laptop computer, a workstation, smart-eyewear, smartwatch, etc. The network 106 can include, for example, the Internet or some other data network, including, but not limited to, any suitable wide area network or local area network.

The AARS 102 includes a processor in communication with a memory 110. The processor may be a CPU 108, an ASIC, or any other similar device. The memory 110 may store secret information, such as user-created login credential information or temporary login credential information generated by the AARS 102. The AARS 102 may also include an authentication secret generator 112 programmed to generate a secret, such as temporary login credential information. The authentication secret generator 112 may be implemented by software executed by the CPU 108. In some instances, the AARS 102 may also include an authentication controller 114 programmed to control the account recovery authentication process. The authentication controller 114 may be implemented by software executed by the CPU 108.

The system 100 also includes multiple secret recovery resources 130A, 130B, 130C. The secret recovery resources 130A, 130B, 130C may be any resource to which the AARS 102 may transmit tokens. For example, the secret recovery resource 130A may be an email address account, the secret recovery resource 130B may be a phone number of a mobile phone, and the secret recovery resource 130C may be a cloud folder. In another example, each of the secret recovery resources 130A, 130B, 130C may be a peer computer system in a peer-to-peer network. The AARS 102 may transmit tokens to the secret recovery resources 130A, 130B, 130C over the network 106. The user device 104 may then access the transmitted tokens from the various secret recovery resources 130A, 130B, 130C and transmit the accessed tokens to the AARS 102. In response, the AARS 102 is programmed to provide or deny access to an online service account based on the received tokens.

In some instances, the AARS 102 may be a component of a website or application platform that enables users to recover access to their service accounts registered with the website or application platform. In other instances, the AARS 102 may be a separate system that is not associated with the website or application platform of the registered service account. For example, users may utilize the AARS 102 as a way of storing their passwords by providing a password to the AARS 102 and storing the output tokens in the users' various secret recovery resources 130A, 130B, 130C. The users may then recover their passwords by providing the tokens to the AARS 102 without resetting their service accounts on the website or application platform.

Figure 2:
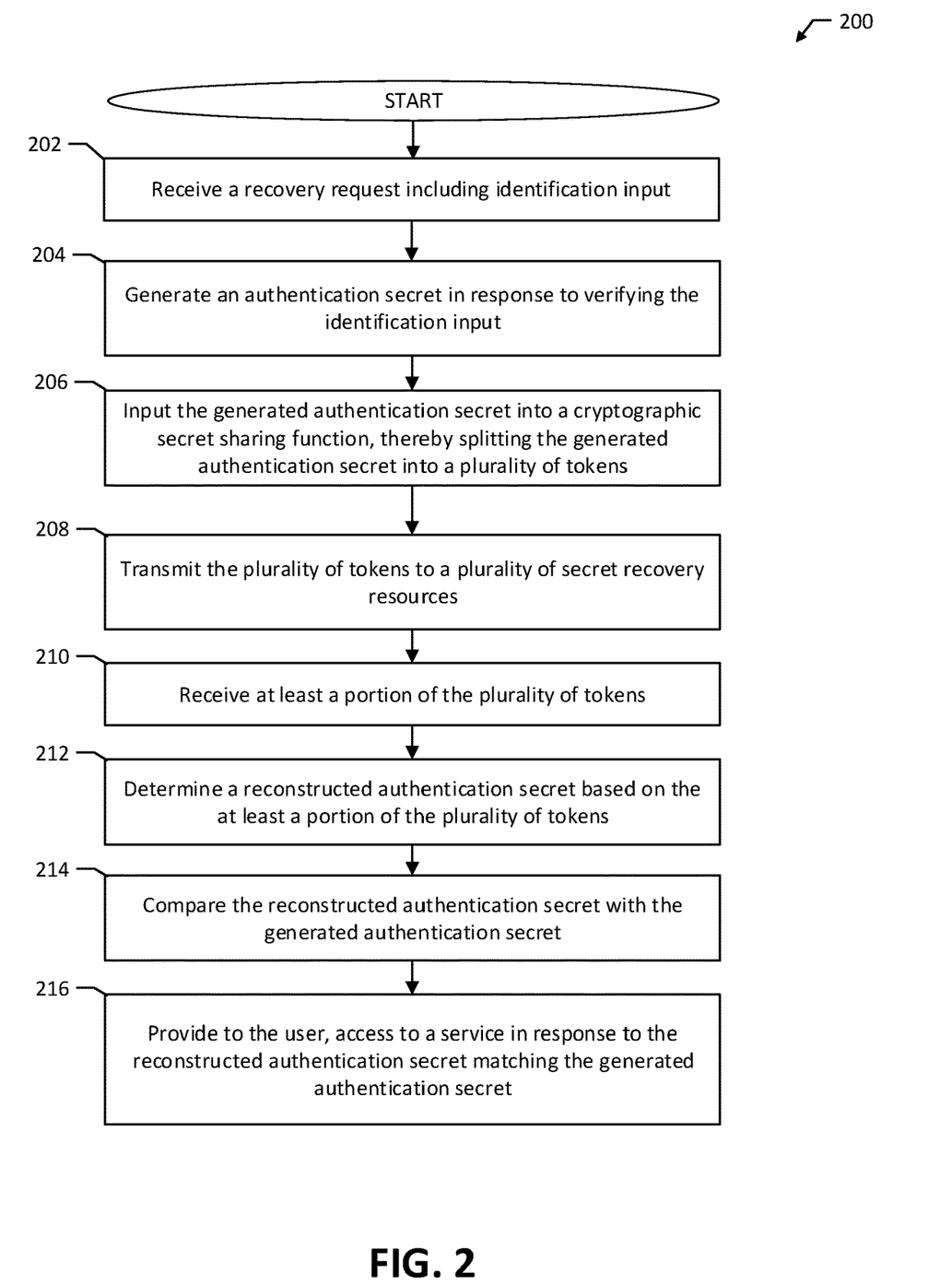
FIG. 2 illustrates a flow chart of an example method for securely recovering access to an online service account, according to an aspect of the present disclosure.

FIG. 2 illustrates a flow chart of an example method 200 for securely recovering access to an online service account. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The method 200 includes receiving a recovery request including identification input (block 202). For example, the AARS 102 may receive a recovery request including identification input from a user device 104. The identification input may be a user's username and/or email address for an online service account. Upon receiving the identification input with a recovery request, the authentication controller 114 may compare the identification input with a database including identification information stored in the memory 110 to determine whether there is a match. For instance, the database may include the identification information for each user account that has been registered with the online service. If the authentication controller 114 determines there is a match, then the identification input is verified. If there is not a match, the AARS 102 may be programmed to transmit a message to the user device 104 indicating that the identification input (e.g., username) was not found. The AARS 102 may also prompt a user of the user device 104 to enter a new identification input.

An authentication secret may be generated in response to verifying the identification input (block 204). In some instances, the generated authentication secret may be a previously stored authentication secret, such as a user's current password that the user cannot remember. For example, the AARS 102 may be programmed to provide users with their passwords without requiring the users to change their passwords. In such instances, generating the authentication secret includes retrieving the authentication secret associated with the verified identification input in a database. For example, the authentication controller 114 may be programmed to retrieve the authentication secret associated with the verified identification input from a database stored in the memory 110. In other instances, generating an authentication secret includes generating a random or pseudo-random string of letters, numbers, and/or characters (e.g., yW3$rL8vJR!), such as with a random or pseudo-random password generator. For example, the AARS 102 may be programmed to provide users with a temporary password or to prompt users to provide a new password after gaining access. In such examples, the authentication secret generator 112 may be programmed to generate a random or pseudo random string of letters, numbers, and/or characters.

In some aspects of the present disclosure, the generated authentication secret is stored, with the user's identification input, in a database. The stored secret may be used again in the account recovery process, as will described in more detail below. Storing the generated authentication secret as cleartext, however, could result in a malicious attacker obtaining the generated authentication secret if the malicious attacker were to compromise the database. In some instances, for example, the generated authentication secret may be a temporary password that is provided to a user to gain access to the user's account, as will be described in more detail below. If the user does not change the temporary password, then the temporary password may be stored in the database for an indefinite amount of time, and thus may be vulnerable to a data breach if stored in cleartext.

In other aspects of the present disclosure, therefore, the generated authentication secret may be input into a one-way cryptographic hash function to obtain a hash output, which is then stored, with the user's identification input, in the database. For instance, the authentication controller 114 may be programmed to input a generated authentication secret into a cryptographic hash function and store the hash output in the memory 110. Any suitably secure cryptographic hash function may be used. A malicious attacker compromising the database will therefore only be able to steal a hash output and not the generated authentication secret. One skilled in the pertinent art will appreciate that a cryptographic hash function maps data of arbitrary size to a bit string of a fixed size, and is practically infeasible to invert to obtain the arbitrarily sized data from the fixed bit string. Storing the hash output of the generated authentication secret therefore increases security of the provided online service account recovery method.

The generated authentication secret may then be input into a cryptographic secret sharing function, thereby splitting the generated authentication secret into a plurality of tokens (block 206). One having skill in the pertinent art will appreciate that a cryptographic secret sharing function refers to a cryptographic algorithm for splitting a secret into multiple different shares or tokens (e.g., 3, 4, 5, 8, 10, 15, 20, 100, etc.). In some instances, each of the different shares or tokens may be unique. The secret can then be reconstructed only when a threshold quantity of the shares or tokens are combined together. Stated differently, the individual shares or tokens cannot reconstruct the secret on their own. In addition, even a subset of the cited shares or secret cannot reconstruct the secret on their own, if the number of contributory shares or token is below a given threshold quantity. Any suitably secure cryptographic secret sharing function may be used to split the generated authentication secret. For example, the authentication controller 114 may be programmed to input the generated authentication secret into the Shamir's Secret Sharing cryptographic function, which will be appreciated by one having skill in the pertinent art. In other examples, the method 200 may involve different cryptographic secret sharing schemes, such as, but not limited to, Blakley's scheme, the Chinese remainder theorem, proactive secret sharing, verifiable secret sharing, computationally secure secret sharing, and/or multi-secret and space efficient (batched) secret sharing.

The threshold quantity of shares or tokens needed to reconstruct a secret split by a secret sharing function may be less than or equal to the total quantity of shares or tokens that the secret sharing function splits the secret into. The threshold quantity may also be adjusted to any predetermined quantity depending on a level of security that is desired. For example, the authentication controller 114 may be programmed to split a generated authentication secret into six tokens and to require five of the tokens to reconstruct the secret. In another example, the authentication controller 114 may be programmed to require three of the six tokens to reconstruct the secret. The first example requiring five tokens may have a higher security level than the second example requiring three tokens because more tokens must be obtained to reconstruct the secret. Stated differently, a malicious attacker has to locate more tokens and may have to compromise more systems to obtain the secret in the first example as compared to the second. Requiring a user to obtain five tokens, however, can be cumbersome and thus in some instances, convenience may be balanced with a level of security needed for a particular application when determining the predetermined or threshold quantity required to reconstruct the secret.

The plurality of tokens are then transmitted to a plurality of secret recovery resources (block 208). The plurality of secret recovery resources may include any quantity of secret recovery resources. For instance, the secret recovery resources may include multiple different phone numbers, multiple different email addresses, multiple different cloud folders, etc. The tokens also may be distributed among the secret recovery resources in any possible distribution. For example, continuing with the first example above in which the generated authentication secret is split into six tokens, in some instances, the authentication controller 114 may be programmed to transmit one token each to six different secret recovery resources. In other instances, the authentication controller 114 may be programmed to transmit two tokens each to three different secret recovery resources. In other instances still, the authentication controller 114 may be programmed to transmit an uneven quantity of tokens to the secret recovery resources, such as two tokens to a first secret recovery resource and one token each to four other secret recovery resources. In another example, the authentication controller 114 may be programmed to transmit duplicate tokens, such as transmitting one token each to six different secret recovery resources and also transmitting one duplicate token each to six more different recovery resources for twelve total tokens transmitted to twelve different secret recovery resources.

A security level of the provided method increases as the quantity of secret recovery resources increases. For example, transmitting the six tokens in the first example above one each to six different secret recovery resources provides a higher level of security than transmitting the six tokens two each to three different secret recovery resources. The greater the quantity of secret recovery resources utilized in dispersing the tokens, the more resources a malicious attacker must compromise in order to obtain sufficient tokens required to impersonate the user. It should be appreciated based on the preceding description that a security level of the provided method may be adjusted based on different combinations of the quantity of secret recovery resources and the threshold quantity of tokens needed to reconstruct the secret.

After transmitting the tokens, the method 200 additionally includes receiving at least a portion of the plurality of tokens (block 210). In an example, after the AARS 102 transmits the tokens to a user's secret recovery resources 130A, 130B, 130C, the user may access some or all of the tokens from the user's secret resources 130A, 130B, 130C via the user's user device 104. For instance, the user may access a quantity of tokens sufficient to satisfy the predetermined threshold required to reconstruct the secret. The user may then transmit some or all of the tokens via the user device 104 to the AARS 102. Accordingly, the AARS 102 (e.g., the authentication controller 114) receives some or all of the tokens.

Once at least a portion of the tokens are received, a reconstructed authentication secret is determined based on the at least a portion of the plurality of tokens (block 212). The reconstructed authentication secret is determined via the same cryptographic secret sharing function that was utilized to split the generated authentication secret into the shares or tokens. For example, the reconstructed authentication secret may be determined via the Shamir's Secret Sharing cryptographic function. As described above, a predetermined threshold quantity of shares or tokens are required to reconstruct the authentication secret. Accordingly, the portion of the plurality of tokens that determining the reconstructed authentication is based on is equal to or greater than the predetermined threshold quantity. If the quantity of tokens received is less than the predetermined threshold quantity, the authentication secret cannot be reconstructed. This aspect provides additional security over typical account recovery methods if, for example, a malicious attacker is able to compromise one of a user's secret recovery resources, but not multiple.

The reconstructed authentication secret is then compared with the generated authentication secret (block 214). In an example, the authentication controller 114 may compare the reconstructed authentication secret with the generated authentication secret that is stored in the memory 110. As described above, in some aspects, the generated authentication secret is input into a one-way cryptographic hash function to obtain a first hash output, which is then stored, with the user's identification input, in a database in the memory 110. In such aspects, the reconstructed authentication secret is also input into the same one-way cryptographic hash function to obtain a second hash output. Comparing the second hash output with the first hash output constitutes comparing the reconstructed authentication secret with the generated authenticated secret in such instances. One having skill in the pertinent art will appreciate that if the reconstructed authentication secret and the generated authenticated secret are then same, then the respective hash outputs will be the same as long as the same cryptographic hash function is utilized.

A user may then be provided access to a service in response to the reconstructed authentication secret matching the generated authentication secret (block 216). In aspects in which hash outputs are compared, a user is provided access in response to the two hash outputs matching. In some instances, providing access to the service includes transmitting the generated authentication secret to one or more secret recovery resources of the plurality of secret recovery resources. For example, the user's current password or a temporary password may be transmitted to a user's recovery email address so that the user is able to gain access to the service using the current or temporary password. In other instances, providing access to the service includes requesting a new authentication secret to be input by the user. For example, upon determining that the reconstructed authentication secret matches the generated authentication secret (or the hash outputs), a website may present a screen to a user requesting that the user input a new password. The user is provided access to the website after inputting the new password.

Figure 3:
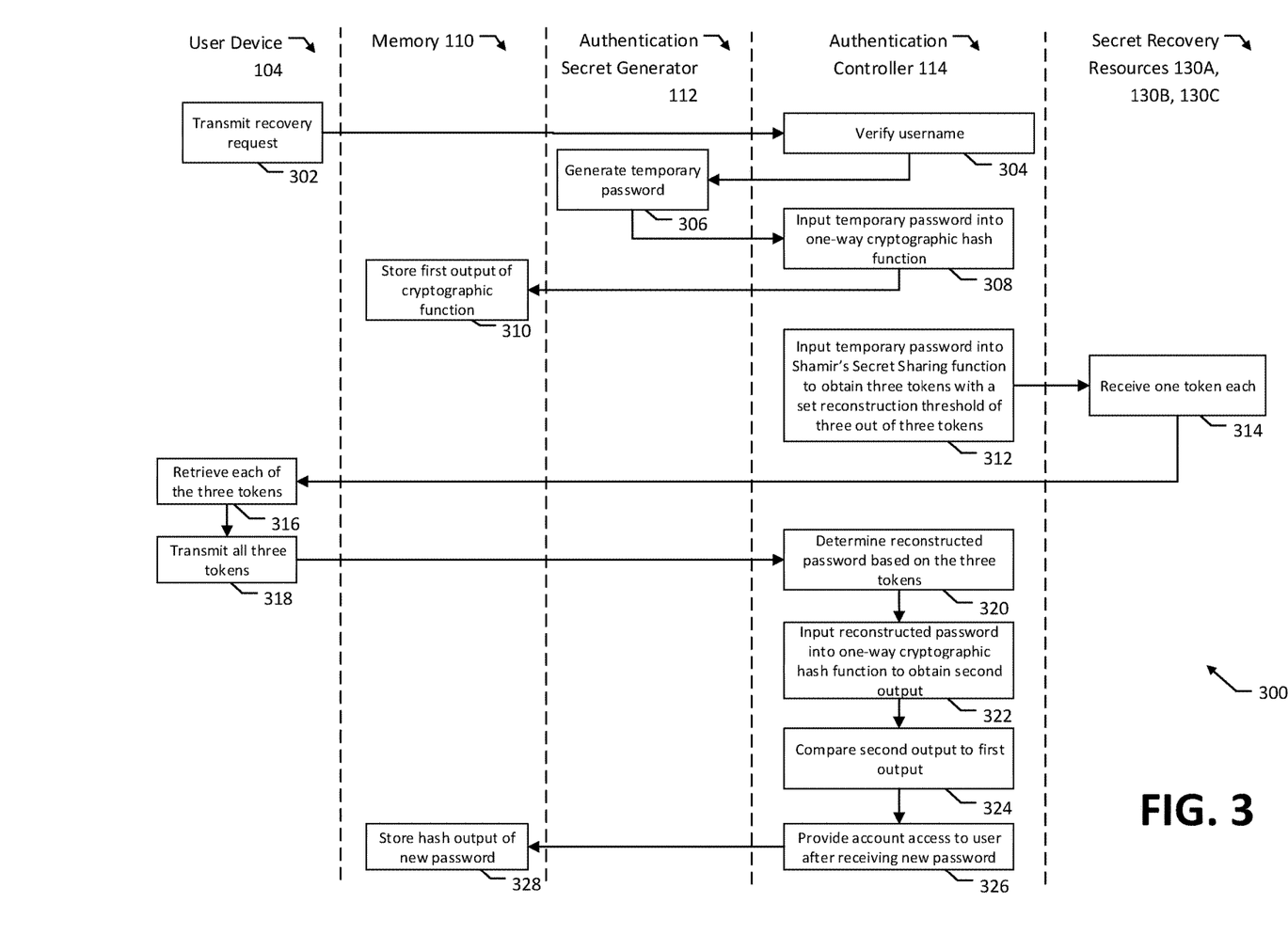
FIG. 3 illustrates a flow diagram of an example method for a website providing account access to a user, according to an aspect of the present disclosure.

FIG. 3 illustrates a flow diagram of an example method 300 for a website providing account access to a registered user. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

A user may input the user's username on a website page via the user's laptop (e.g., user device 104) and select an option indicating that the user has forgotten the user's password to the user's account and requests a password reset. The user device 104 transmits this request to the authentication controller 114 (block 302). The authentication controller 114 then verifies that the input username is registered (block 304). For instance, the authentication controller 114 locates the input username in a database of registered users stored in the memory 110. If the username is not located, the authentication controller 114 may transmit a message to the user device 104 indicating that the username was not found. Upon the authentication controller 114 verifying the username, the authentication secret generator 112 generates a temporary password (block 306). The temporary password is a random string of letters, numbers, and characters. The authentication controller 308 inputs the temporary password into a one-way cryptographic has function to obtain a first hash output (block 308). The authentication controller 308 transmits the first hash output to the memory 110 for storage (block 310). The memory 110 stores the first hash output in a registered users database and associates the first hash output with the username of the user requesting a password reset.

The authentication controller 114 additionally inputs the temporary password into the Shamir's Secret Sharing function, which splits the temporary password into three unique tokens (block 312). In this example, the Shamir's Secret Sharing function is programmed with a reconstruction threshold of all three tokens. The authentication controller 114 then transmits one token to the secret recovery resource 130A (e.g., the user's first email address), one token to the secret recovery resource 130B (e.g., the user's second email address), and one token to the secret recovery resource 130C (e.g., the user's mobile phone number) (block 314). Once the tokens are transmitted, the user obtains the tokens from the user's email address accounts and mobile phone via one or more of the user's devices (block 316). The user then transmits the tokens to the authentication controller 114 via the user device 104 (block 318).

The authentication controller 114 determines a reconstructed password based on the three tokens and the Shamir's Secret Sharing function (block 320). Since all three tokens were transmitted, the predetermined threshold of tokens is met and the reconstructed password is obtained. The reconstructed password is then input into the one-way cryptographic hash function to obtain a second hash output (block 322). The authentication controller 114 compares the second hash output with the first hash output stored in the memory 110 (block 324). If the hash outputs do not match, the authentication controller 114 transmits a message to the user device 104 that the password reset was unsuccessful. If the hash outputs match, the authentication controller 114 transmits a request to the user device 104 for a new password. Once the user transmits a new password via the user device 104, the authentication controller 114 provides the user with access to the service (block 326). The new password is input into the one-way cryptographic hash function to obtain a third hash output, which is stored in the memory 110 by replacing the first hash output of the temporary password (block 328).

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as GPUs, ASICs, or any other similar devices. The instructions may be configured to be executed by one or more processors, which when executing the series of computer instructions, performs or facilitates the performance of all or part of the disclosed methods and procedures.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. An authentication input recovery system comprising:
a memory; and
a processor, in communication with the memory, configured to:
receive a recovery request from a user including identifying input;
generate an authentication secret in response to verifying the identifying input;
input the generated authentication secret into a cryptographic secret sharing function, thereby splitting the generated authentication secret into a plurality of tokens;
transmit the plurality of tokens to a plurality of secret recovery resources;
receive at least a portion of the plurality of tokens from the user;
determine a reconstructed authentication secret based on the at least a portion of the plurality of tokens;
compare the reconstructed authentication secret to the generated authentication secret; and
provide to the user, access to a service in response to the reconstructed authentication secret matching the generated authentication secret.

2. The system of claim 1, wherein the authentication secret is generated by a random or pseudo-random password generator.

3. The system of claim 1, wherein each secret recovery resource of the plurality of secret recovery resources is one selected from the group consisting of a phone number, an email address, and a cloud folder.

4. The system of claim 1, wherein each secret recovery resource of the plurality of secret recovery resources is a peer computer system of a peer-to-peer network.

5. The system of claim 1, wherein the plurality of secret recovery resources is equal to three or more secret recovery resources.

6. The system of claim 1, wherein each token of the plurality of tokens is unique compared to the other tokens.

7. The system of claim 1, wherein an equal quantity of tokens is transmitted between each of the plurality of secret recovery resources.

8. The system of claim 1, wherein an unequal quantity of tokens is transmitted between each of the plurality of secret recovery resources.

9. A method comprising:
receiving a recovery request from a user including identifying input;
generating an authentication secret in response to verifying the identifying input;
inputting the generated authentication secret into a cryptographic secret sharing function, thereby splitting the generated authentication secret into a plurality of tokens;
transmitting the plurality of tokens to a plurality of secret recovery resources;
receiving at least a portion of the plurality of tokens from the user;
determining a reconstructed authentication secret based on the at least a portion of the plurality of tokens;
comparing the reconstructed authentication secret to the generated authentication secret; and
providing to the user, access to a service in response to the reconstructed authentication secret matching the generated authentication secret.

10. The method of claim 9, further comprising:
inputting the generated authentication secret into a one-way cryptographic hash function, thereby obtaining a first output; and
inputting the reconstructed authentication secret into the one-way cryptographic hash function, thereby obtaining a second output,
wherein comparing the reconstructed authentication secret to the generated authentication secret includes comparing the second output to the first output, and
wherein the method includes providing to the user, access to the service in response to the second output matching the first output.

11. The method of claim 9, wherein the generated authentication secret is a previously stored authentication secret.

12. The method of claim 9, wherein the cryptographic secret sharing function is the Shamir's Secret Sharing cryptographic function.

13. The method of claim 9, wherein providing access to the service includes transmitting the generated authentication secret to one or more secret recovery resources of the plurality of secret recovery resources.

14. The method of claim 9, wherein providing access to the service includes requesting a new authentication secret to be input by the user.

15. The method of claim 9, wherein determining the reconstructed authentication secret is based on the Shamir's Secret Sharing cryptographic function.

16. The method of claim 9, wherein determining the reconstructed authentication secret requires a predetermined quantity of tokens of the plurality of tokens and the at least a portion of the plurality of tokens is equal to or greater than the predetermined quantity.

17. The method of claim 16, wherein the plurality of tokens includes a quantity of tokens that is greater than the predetermined quantity of tokens.

18. A non-transitory, computer-readable medium storing instructions which, when performed by a processor, cause the processor to:
receive a recovery request from a user including identifying input;
generate an authentication secret in response to verifying the identifying input;
input the generated authentication secret into a cryptographic secret sharing function, thereby splitting the generated authentication secret into a plurality of tokens;
transmit the plurality of tokens to a plurality of secret recovery resources;
receive at least a portion of the plurality of tokens from the user;
determine a reconstructed authentication secret based on the at least a portion of the plurality of tokens, wherein determining the reconstructed authentication secret requires a predetermined quantity of tokens of the plurality of tokens and the at least a portion of the plurality of tokens is equal to or greater than the predetermined quantity;
compare the reconstructed authentication secret to the generated authentication secret; and provide to the user, access to a service in response to the reconstructed authentication secret matching the generated authentication secret.

19. The non-transitory, computer-readable medium of claim 18, wherein the authentication secret is a password.

20. The non-transitory, computer-readable medium of claim 18, wherein the identifying input is a username.

* * * * *